(12) United States Patent
Fujita et al.

(10) Patent No.: US 11,506,779 B2
(45) Date of Patent: Nov. 22, 2022

(54) VEHICLE OUTSIDE SENSOR UNIT

(71) Applicant: HONDA MOTOR CO., LTD., Tokyo (JP)

(72) Inventors: Akira Fujita, Wako (JP); Takato Watanabe, Wako (JP); Yoshitaka Katashima, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 990 days.

(21) Appl. No.: 16/242,052

(22) Filed: Jan. 8, 2019

(65) Prior Publication Data

US 2019/0219690 A1 Jul. 18, 2019

(30) Foreign Application Priority Data

Jan. 18, 2018 (JP) .............................. JP2018-006332

(51) Int. Cl.
*G01S 13/931* (2020.01)
*B60R 11/00* (2006.01)
(Continued)

(52) U.S. Cl.
CPC ............ *G01S 13/931* (2013.01); *B60R 11/00* (2013.01); *G01S 7/02* (2013.01); *G01S 7/40* (2013.01);
(Continued)

(58) Field of Classification Search
CPC ........ G01S 13/931; G01S 7/40; G01S 7/4026; G01S 7/4972; G01S 17/06; G01S 7/027;
(Continued)

(56) References Cited

U.S. PATENT DOCUMENTS 5,038,612 A * 8/1991 Thelen ..................... G01S 7/521
73/632
5,748,294 A * 5/1998 Katayama ................. B60T 7/22
180/169
(Continued)

FOREIGN PATENT DOCUMENTS

CN 104875686 9/2015
CN 104875687 9/2015
(Continued)

OTHER PUBLICATIONS

Japanese Notice of Allowance for Japanese Patent Application No. 2018-006332 dated Oct. 1, 2019.
(Continued)

*Primary Examiner* — John A Tweel, Jr.
(74) *Attorney, Agent, or Firm* — Amin, Turocy & Watson, LLP (57) ABSTRACT

An outside sensor unit includes an outside sensor, a main bracket, a support bracket, a rotation device, and a position adjustment device. The outside sensor detects the outside of a vehicle. The main bracket is attached to a vehicle body. The support bracket supports the outside sensor and is attached to the main bracket. The rotation device has a rotation axis line which is substantially parallel to a roll axis of the vehicle and connects the support bracket and the main bracket together rotatably around the rotation axis line. The position adjustment device is capable of adjusting the relative rotation position between the support bracket and the main bracket around the rotation axis line.

7 Claims, 6 Drawing Sheets

(51) Int. Cl.
| | |
|---|---|
| *G01S 17/06* | (2006.01) |
| *G01S 7/40* | (2006.01) |
| *G01S 7/497* | (2006.01) |
| *G01S 15/931* | (2020.01) |
| *G01S 7/02* | (2006.01) |
| *G01S 17/931* | (2020.01) |
| *G01S 7/52* | (2006.01) |

(52) U.S. Cl.
CPC .......... *G01S 7/4026* (2013.01); *G01S 7/4972* (2013.01); *G01S 15/931* (2013.01); *G01S 17/06* (2013.01); *G01S 17/931* (2020.01); *B60R 2011/004* (2013.01); *B60R 2011/0085* (2013.01); *G01S 7/027* (2021.05); *G01S 7/4034* (2021.05); *G01S 7/52004* (2013.01); *G01S 2013/9323* (2020.01); *G01S 2013/9324* (2020.01); *G01S 2013/93271* (2020.01); *G01S 2013/93275* (2020.01); *G01S 2015/938* (2013.01)

(58) Field of Classification Search
CPC ............... G01S 7/4034; G01S 7/52004; G01S 2013/93271; G01S 2013/93275; G01S 2015/38; G01S 7/521; B60R 11/00; B60R 2011/004; B60R 2011/0085
See application file for complete search history.

(56) References Cited

U.S. PATENT DOCUMENTS

| | | | | |
|---|---|---|---|---|
| 6,744,399 | B2* | 6/2004 | Tohyama | .............. G01S 7/4026 342/174 |
| 6,781,559 | B2* | 8/2004 | Winter | ................. G01S 7/4026 403/14 |
| 9,705,189 | B2* | 7/2017 | Weber | .................... G01S 13/931 |
| 10,670,714 | B2* | 6/2020 | Fujita | ...................... B60R 11/00 |
| 2012/0086593 | A1* | 4/2012 | Weber | ................... G01S 7/4026 342/146 |

FOREIGN PATENT DOCUMENTS

| | | |
|---|---|---|
| CN | 106371069 | 2/2017 |
| EP | 2786904 | 10/2014 |
| JP | 09-113607 | 5/1997 |
| JP | 2000-137069 | 5/2000 |
| JP | 2004-317507 | 11/2004 |
| JP | 2005-069735 | 3/2005 |
| JP | 2006-091177 | 4/2006 |
| JP | 2010-006105 | 1/2010 |
| JP | 2015-025696 | 2/2015 |
| JP | 2016-203788 | 12/2016 |
| KR | 10-2004-0027701 | 4/2004 |

OTHER PUBLICATIONS

Japanese Office Action for Japanese Patent Application No. 2018-006332 dated Jul. 9, 2019.
Chinese Office Action for Chinese Patent Application No. 201811653930.1 dated Dec. 10, 2021.

* cited by examiner

VEHICLE OUTSIDE SENSOR UNIT

CROSS-REFERENCE TO RELATED APPLICATION

Priority is claimed on Japanese Patent Application No. 2018-006332, filed on Jan. 18, 2018, the contents of which are incorporated herein by reference.

BACKGROUND

Field of the Invention

The present invention relates to a vehicle outside sensor unit that includes an outside sensor such as a millimeter-wave radar.

Background

In recent years, drive assist systems such as an automatic brake system have been put to practical use. An outside sensor such as a millimeter-wave radar that monitors a situation around a vehicle is used for the drive assist system. In such a system, in order to secure the detection accuracy of the outside sensor, it becomes important to arrange a detection surface of the outside sensor toward an appropriate direction of the vehicle.

In the related art, an outside sensor that can adjust a slant angle in a vehicle roll direction of a detection surface has been proposed (for example, refer to Japanese Patent Application, Publication No. 2004-317507A).

SUMMARY

In the outside sensor, it is effective to provide a mechanism that adjusts the slant angle in the vehicle roll direction of the detection surface. However, in that case, the structure of the outside sensor is complicated, which tends to cause an increase of product costs.

An aspect of the present invention provides a vehicle outside sensor unit capable of appropriately adjusting a slant angle in a vehicle roll direction of an outside sensor without complicating a structure of the outside sensor.

A vehicle outside sensor unit according to an aspect of the present invention includes: an outside sensor that detects a situation around a vehicle; a main bracket that is attached to a vehicle body; a support bracket that supports the outside sensor and that is attached to the main bracket; a rotation device that has a rotation axis line which is substantially parallel to a roll axis of the vehicle and that connects the support bracket and the main bracket together rotatably around the rotation axis line; and a position adjustment device that is capable of adjusting a relative rotation position between the support bracket and the main bracket around the rotation axis line.

According to the above configuration, when the position adjustment device is operated, the support bracket is rotated around the rotation axis line which is substantially parallel to the roll axis of the vehicle, and, as a result, the outside sensor that is supported by the support bracket is rotated with respect to the main bracket. Accordingly, by operating the position adjustment device, it is possible to appropriately adjust a slant angle in a vehicle roll direction of the outside sensor. Further, the above configuration is a configuration in which the support bracket and the main bracket are connected together by the rotation device, and the relative rotation position between the support bracket and the main bracket is adjusted by the position adjustment device, and therefore, it is possible to simplify the structure of the outside sensor.

The rotation device may have a rotation shaft that penetrates through at least one of the support bracket and the main bracket at an opposite side of an outside detection direction of the outside sensor, and an axis line of the rotation shaft may constitute the rotation axis line.

In this case, it is possible to connect the support bracket and the main bracket together rotatably by a simple configuration, and since the rotation device is not positioned in the outside detection direction of the outside sensor, it is possible to ensure a wide outside detection range of the outside sensor.

The support bracket may have a first penetration hole through which the rotation shaft penetrates, the main bracket may have a second penetration hole through which the rotation shaft penetrates, and the rotation shaft may be rotatably inserted through the first penetration hole and the second penetration hole.

In this case, the rotation shaft is merely inserted in the first penetration hole and the second penetration hole and is not fixed to the support bracket and the main bracket by welding or the like. Therefore, it is possible to easily assemble the rotation device to the support bracket and the main bracket.

The position adjustment device may include a male screw member that is provided on any one of the support bracket and the main bracket at a position which is separated from the rotation axis line and a female screw member that is provided on the other of the support bracket and the main bracket at a position which is separated from the rotation axis line and that is screwed to the male screw member.

In this case, by rotating the male screw member and the female screw member relative to each other, it is possible to adjust the separation distance in the axis direction between the male screw member and the female screw member. Therefore, by rotating the male screw member and the female screw member relative to each other, it is possible to rotate the support bracket and the main bracket relative to each other around the rotation axis line. Accordingly, for example, by operating the male screw member to be rotated by a tool or the like, it is possible to adjust the slant angle in the vehicle roll direction of the outside sensor.

The position adjustment device may have a tool insertion opening in which a tool for rotating the male screw member and the female screw member relative to each other is inserted, and the tool insertion opening may be opened toward the outside detection direction of the outside sensor.

In this case, it is possible to insert the tool in the tool insertion opening from the outside detection direction of the outside sensor and rotate the male screw member and the female screw member of the position adjustment device relative to each other. At this time, even when the tool is operated so as to be pressed, the press load is smoothly supported by the vehicle body side, and therefore, it is possible to prevent the support bracket and the main bracket from being fluctuated when the tool is operated. Accordingly, when this configuration is employed, it is possible to stably perform the operation of the position adjustment device.

The vehicle outside sensor unit may include a cover member that covers the support bracket and the position adjustment device from the outside detection direction of the outside sensor.

In this case, since the support bracket and the position adjustment device are covered by the cover member, by a simple configuration, it is possible to prevent the degradation of an appearance due to the support bracket and the position adjustment device being seen from the outside, and it is possible to protect the position adjustment device from the outside by the cover member.

The vehicle outside sensor unit may include a positioning fixation member that fixes the relative rotation position between the support bracket and the main bracket.

In this case, it is possible to adjust the relative rotation position between the support bracket and the main bracket by the position adjustment device and then fix the relative rotation position between the support bracket and the main bracket by the positioning fixation member. Thereby, it is possible to prevent the relative rotation position between the support bracket and the main bracket from being displaced by the self-weight of the outside sensor and the support bracket or an input of an external force.

According to an aspect of the present invention, by operating the position adjustment device, the support bracket and the main bracket are rotated relative to each other, and thereby, it is possible to adjust the slant angle in the vehicle roll direction of the outside sensor.

Therefore, according to an aspect of the present invention, it is possible to appropriately adjust the slant angle in the vehicle roll direction of the outside sensor without complicating the structure of the outside sensor.

DESCRIPTION OF THE EMBODIMENTS

Hereinafter, an embodiment of the present invention will be described with reference to the drawings.

Figure 1:
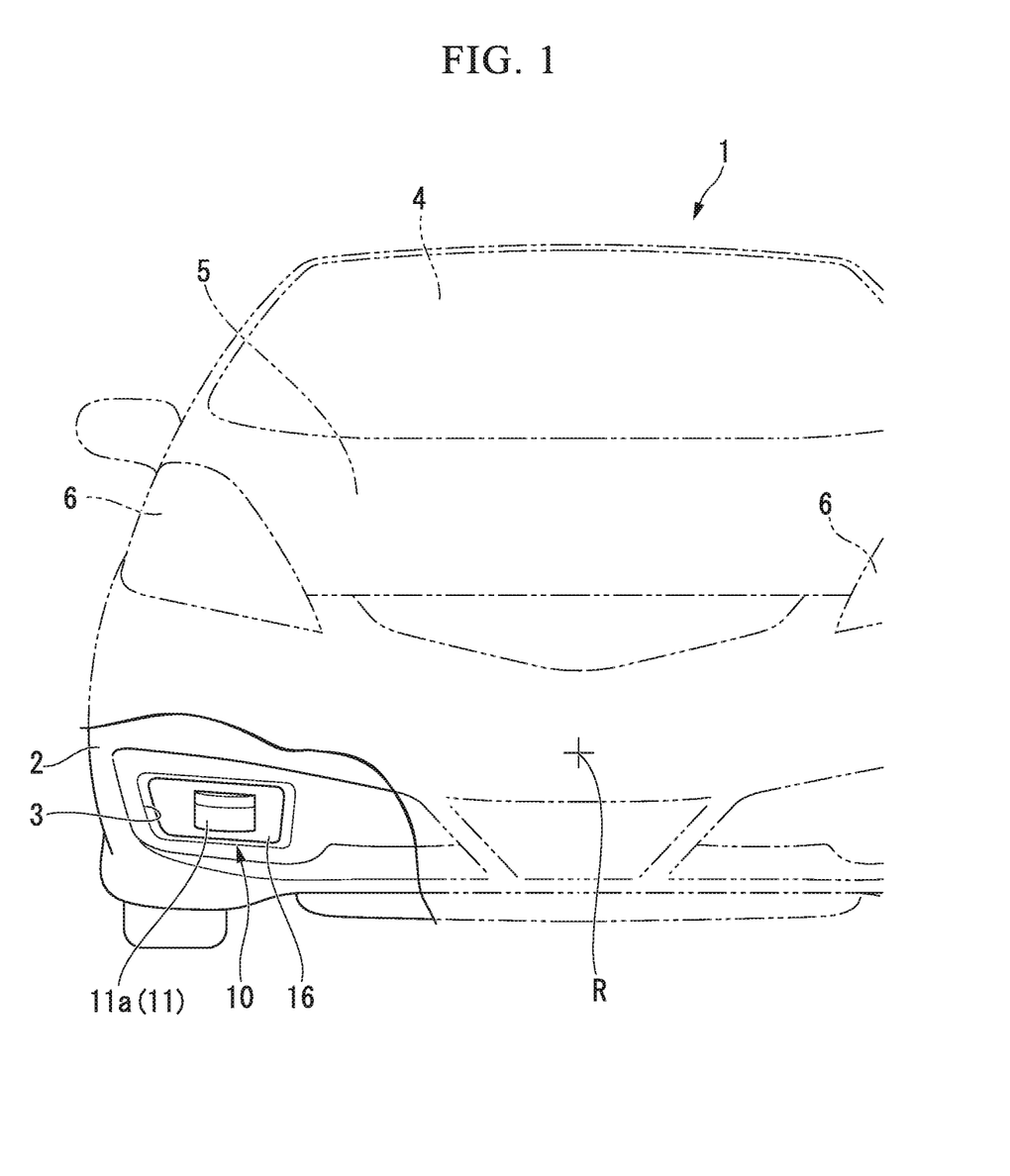
FIG. 1 is a schematic front view of a vehicle to which an outside sensor unit is attached according to an embodiment of the present invention.

FIG. 1 is a schematic front view of a vehicle 1 to which an outside sensor unit 10 is attached of the present embodiment.

The outside sensor unit 10 is provided on each of right and left side edge portions of a vehicle body front lower part.

In FIG. 1, only an outside sensor unit 10 that is provided on the right side of the vehicle front part is shown, but an outside sensor unit 10 is similarly provided also on the left side of the vehicle front part. The outside sensor unit 10 is attached to a frame member (not shown) of the vehicle body via a main bracket 12 (refer to FIG. 2 to FIG. 6) described below. An opening 3 having a substantially rectangle shape elongated transversely is formed on right and left lower edges of a bumper face 2 of a front bumper of a vehicle 1. The outside sensor unit 10 is arranged at a rearward position of the opening 3 of the bumper face 2.

In FIG. 1, a front windshield glass 4 in front of a front seat of the vehicle 1, an engine hood 5, and a headlight 6 are shown.

Figure 2:
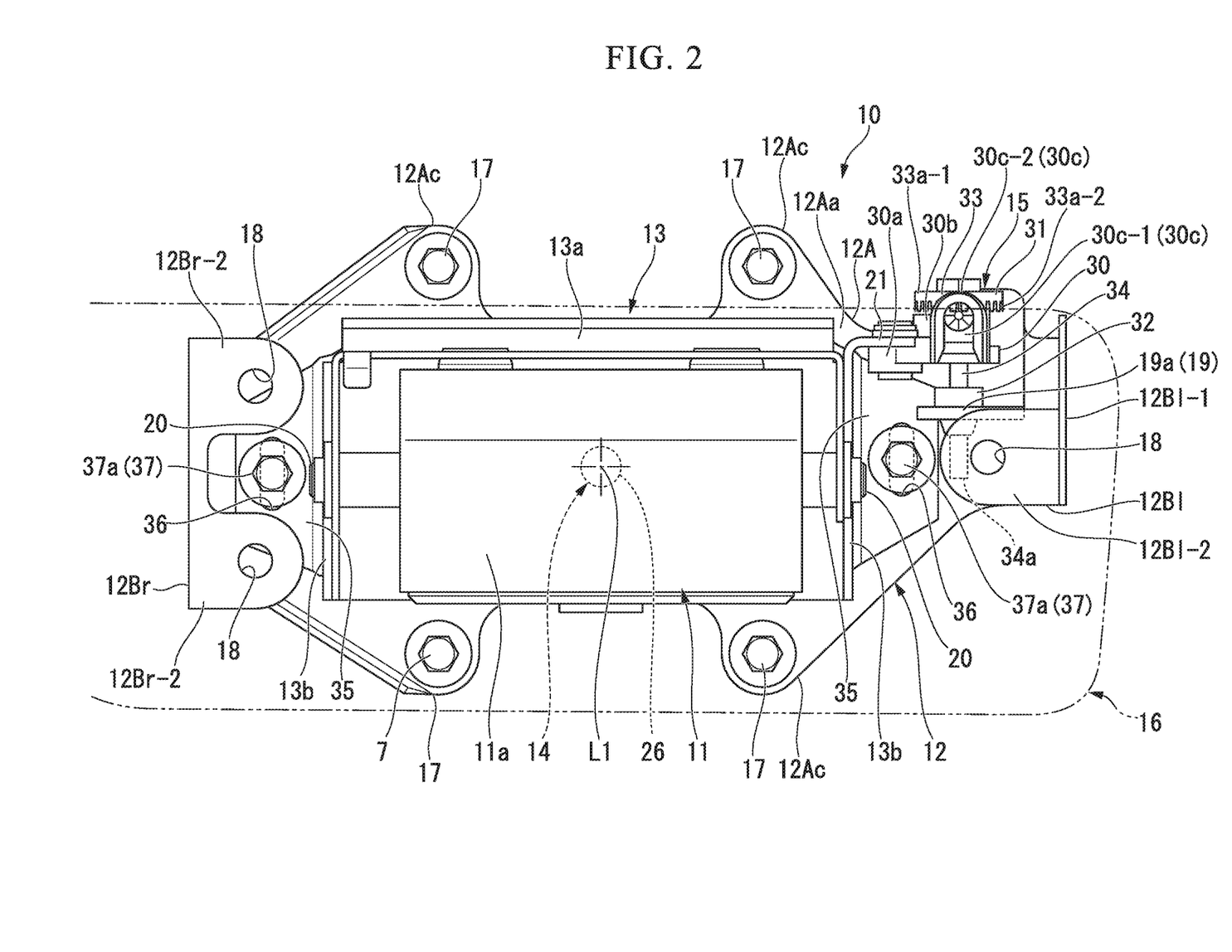
FIG. 2 is a front view of the outside sensor unit from which part of components are removed according to the embodiment of the present invention.
Figure 3:
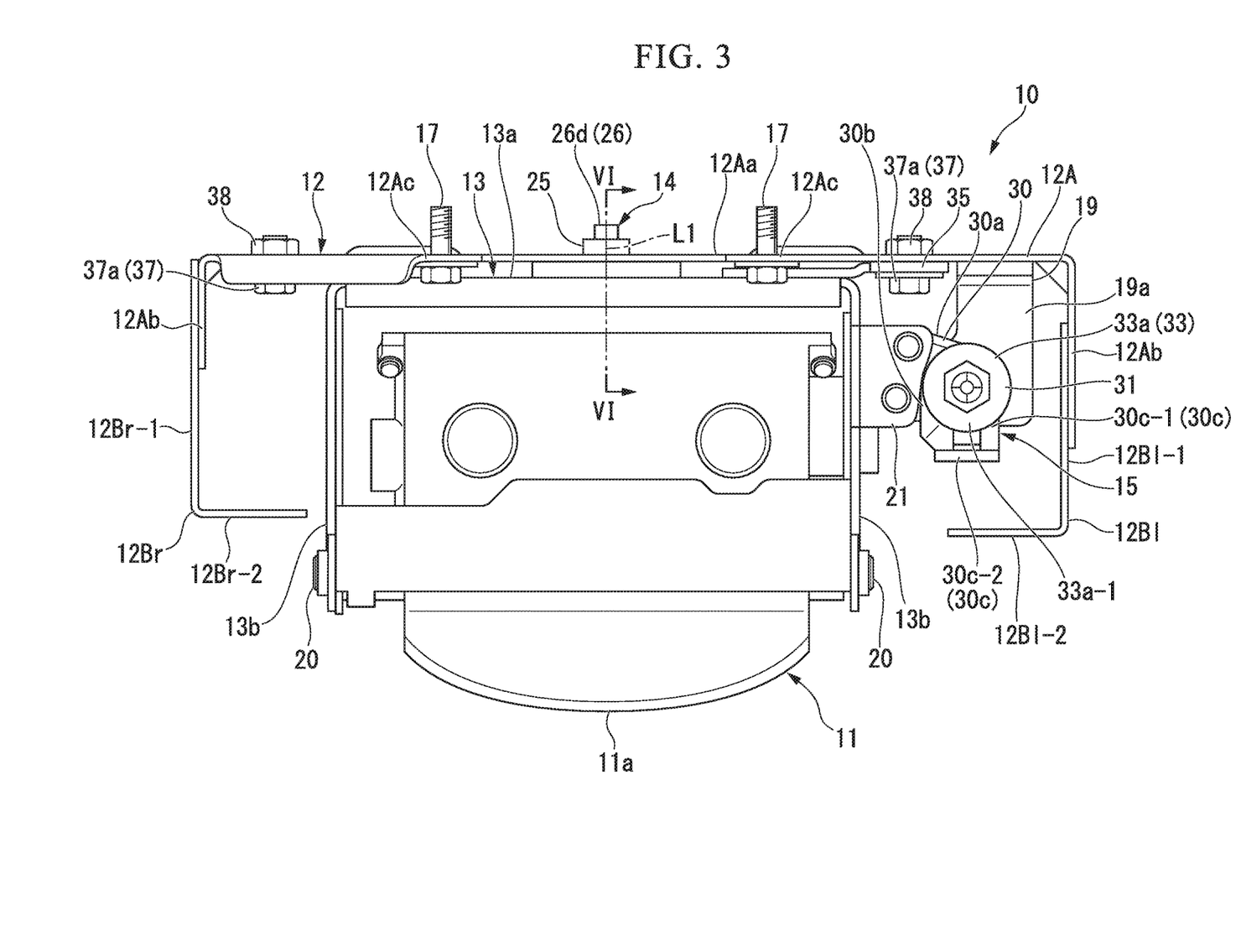
FIG. 3 is a top view of the outside sensor unit from which part of components are removed according to the embodiment of the present invention.
Figure 4:
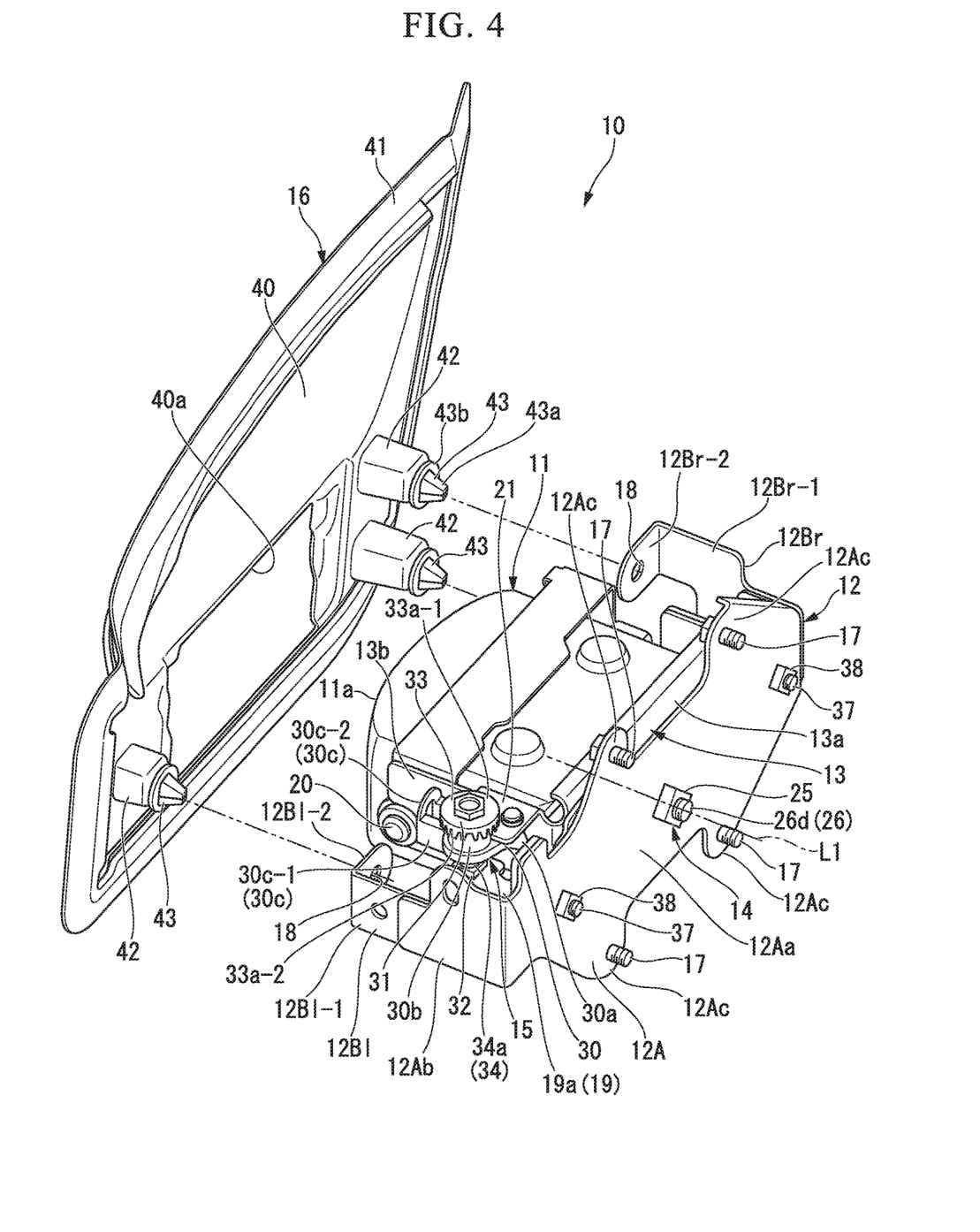
FIG. 4 is an exploded perspective view of the outside sensor unit according to the embodiment of the present invention.
Figure 5:
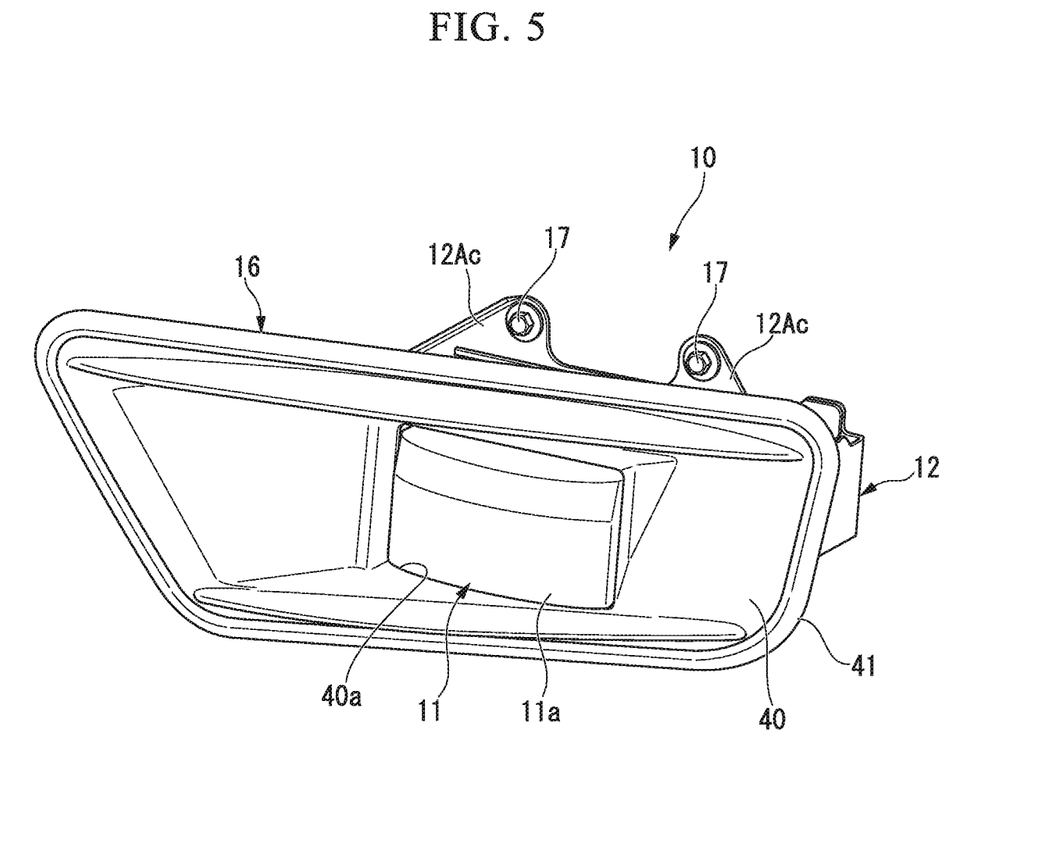
FIG. 5 is a perspective view of the outside sensor unit according to the embodiment of the present invention.

FIG. 2 is a view of the outside sensor unit 10 from which part of components are removed when seen from the frontward direction. FIG. 3 is a view of the outside sensor unit 10 from which part of components are removed when seen from the upper surface. FIG. 4 is a view in which part of the outside sensor unit 10 is disassembled when seen from a rearward, leftward, and diagonally upward part. FIG. 5 is a view of the outside sensor unit 10 when seen from a frontward and diagonally upward part. The upside, downside, right, left, front, and rear in the following description of the structure of the outside sensor unit 10 mean the upside, downside, right, left, front, and rear in a state of being attached to the vehicle body.

The outside sensor unit 10 includes an outside sensor 11 that detects the vehicle frontward direction (a situation around a vehicle), the main bracket 12 and a support bracket 13 for attaching the outside sensor 11 to the vehicle body, a rotation mechanism 14 (rotation device) that connects the support bracket 13 and the main bracket 12 together rotatably, a position adjustment mechanism 15 (position adjustment device) that adjusts a relative rotation position between the support bracket 13 and the main bracket 12, and a cover member 16 that covers the circumference of the front part side of the outside sensor 11.

The outside sensor 11 has a main body part having a cuboid shape, and a front surface of the main body part is an outside detection surface 11a. The outside sensor 11 can be constituted of, for example, a millimeter-wave radar, a laser radar, an ultrasonic sensor, a sonar, an optical camera, and the like. In the present embodiment, a millimeter-wave radar is employed as the outside sensor 11.

The main bracket 12 includes: a base plate 12A made of a metal and having a substantially U shape in a top view; and a pair of supplement plates 12B1, 12Br made of a metal and having a substantially L shape in a top view. Each of the supplement plates 12B1, 12Br is fixed by welding to the base plate 12A. The base plate 12A has a base wall 12Aa that faces the vehicle frontward direction in a state of being attached to the vehicle body and a joint wall 12Ab that extends toward the vehicle frontward direction from each of right and left end parts of the base wall 12Aa. A pair of fastening flanges 12Ac is provided to extend on each of upper and lower sides of the base wall 12Aa. Each of fastening flanges 12Ac is fixed to a frame member (not shown) on the vehicle body side by a bolt 17 which is a fastening member.

A fixation bracket 19 having a substantially L shape for fixing the position adjustment mechanism 15 described later is attached to a left side edge part of the base wall 12Aa. The fixation bracket 19 includes an extension wall 19a that extends substantially horizontally frontward from the front surface of the base wall 12Aa.

The left supplement plate 12B1 has a base wall 12B1-1 that is fixed by welding to the left joint wall 12Ab of the base plate 12A and a bent wall 12B1-2 that is bent inward in the width direction from the base wall 12B1-1. The right supplement plate 12Br has a base wall 12Br-1 that is fixed by welding to the right joint wall 12Ab of the base plate 12A and a bent wall 12Br-2 that is bent inward in the width direction from the base wall 12Br-1. The width in the vertical direction of the left supplement plate 12B1 is about half of the width in the vertical direction of the right supplement plate 12Br. A latch hole 18 having a circular shape is formed on the bent wall 12B1-2 of the left supplement plate 12B1. Two bent walls 12Br-2 of the right supplement plate 12Br are provided on the base wall 12Br-1 so as to be spaced by a predetermined distance in the vertical direction from each other. A latch hole 18 having a circular shape is formed also on each of the bent walls 12Br-2. The bent walls 12B1-2, 12Br-2 of the left and right supplement plates 12B1, 12Br constitute an attachment seat to which the cover member 16 described below is attached.

The support bracket 13 is formed of a plate material made of a metal and having a substantially U shape in a top view. The support bracket 13 has a base wall 13a that faces the vehicle frontward direction in a state of being attached to the vehicle body and a support wall 13b that extends toward the vehicle frontward direction from each of right and left end parts of the base wall 13a. The base wall 13a of the support bracket 13 is arranged to face the front surface of the base wall 12Aa of the main bracket 12 and is rotatably connected to the base wall 12Aa of the main bracket 12 via the rotation mechanism 14. The main body part of the outside sensor 11 is arranged between the right and left support walls 13b. The main body part of the outside sensor 11 is fixed to the right and left support walls 13b of the support bracket 13 via a bolt 20 which is a fastening member and the like.

A fixation wall 21 that extends substantially horizontally toward the left side direction is provided on an upper part close to the base wall 13a of the left support wall 13b. The position adjustment mechanism 15 described below is fixed to the fixation wall 21.

Figure 6:
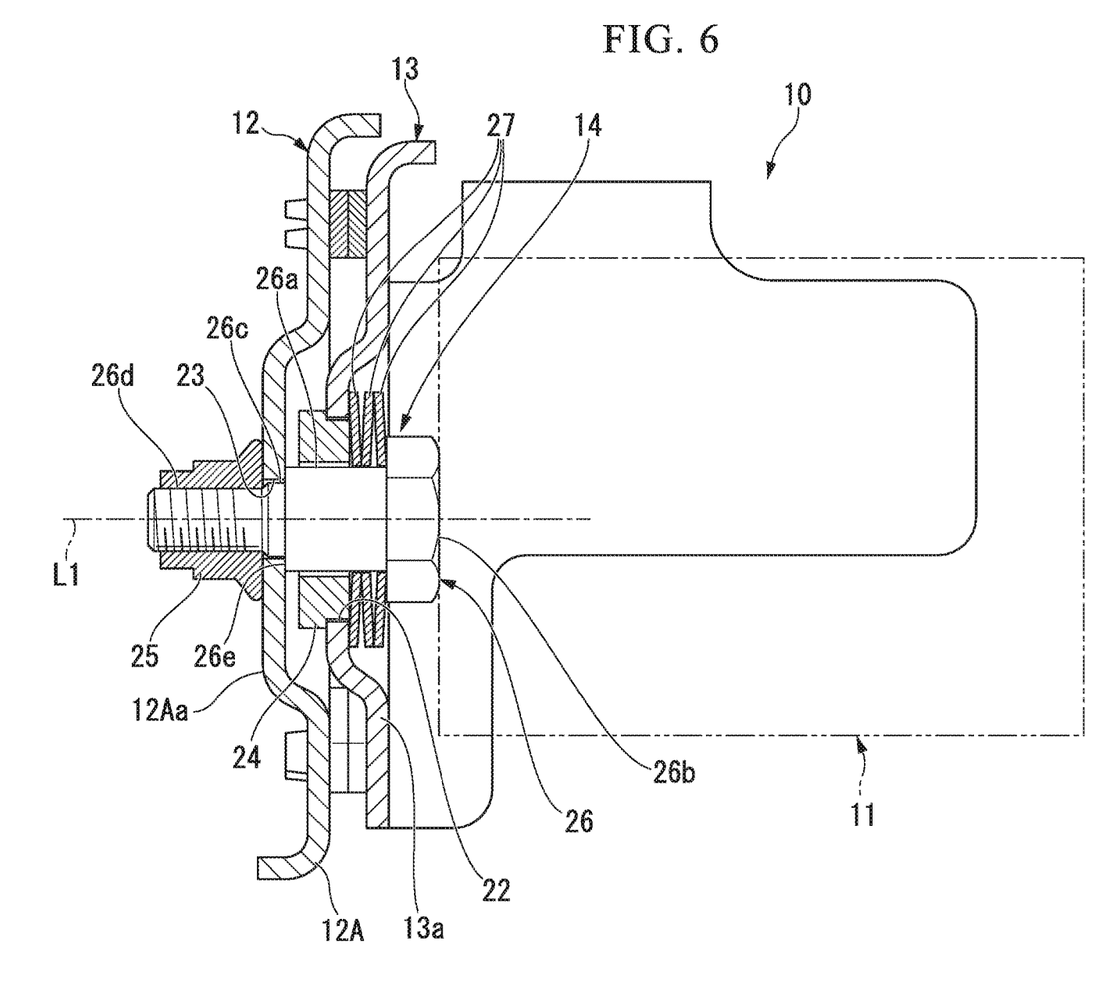
FIG. 6 is a cross-sectional view along a VI-VI line of FIG. 3 of the outside sensor unit according to the embodiment of the present invention.

FIG. 6 is a view showing a cross-section along a VI-VI line of FIG. 3 of the outside sensor unit 10.

As shown in FIG. 6, a first penetration hole 22 that has a circular shape and that penetrates in the front-to-rear direction (thickness direction) of the base wall 13a is formed on a substantially center part of the base wall 13a of the support bracket 13. A bearing ring 24 is attached to an inner circumferential part of the first penetration hole 22.

A second penetration hole 23 that has a circular shape and that penetrates in the front-to-rear direction (thickness direction) of the base wall 12Aa is formed on a substantially center part of the base wall 12Aa of the main bracket 12. The second penetration hole 23 is formed to have a smaller diameter than the first penetration hole 22. A weld nut 25 is provided on the rear surface of the base wall 12Aa of the main bracket 12 at a position that surrounds the second penetration hole 23. A shaft part of a support bolt 26 is inserted from the front direction of the support bracket 13 through the first penetration hole 22 and the second penetration hole 23.

The support bolt 26 has a large diameter shaft part 26a, a head part 26b that is provided to continue to one end of the large diameter shaft part 26a, a small diameter shaft part 26c that is provided to continue to the other end of the large diameter shaft part 26a, and a male screw part 26d that is provided to continue to an end part of the small diameter shaft part 26c at the opposite side of the large diameter shaft part 26a. The large diameter shaft part 26a, the small diameter shaft part 26c, and the male screw part 26d are concentrically formed. The large diameter shaft part 26a is fitted rotatably to an inner part of the bearing ring 24 that is attached to the first penetration hole 22. The small diameter shaft part 26c is fitted to the second penetration hole 23. The male screw part 26d is fastened to the weld nut 25.

When the male screw part 26d of the support bolt 26 is fastened to the weld nut 25, a circumferential edge part of the second penetration hole 23 is sandwiched between the weld nut 25 and a step part 26e between the large diameter shaft part 26a and the small diameter shaft part 26c. As a result, the support bolt 26 is fixed to the base wall 12Aa of the main bracket 12. In this state, the support bracket 13 is connected rotatably to the main bracket 12 via the bearing ring 24 and the large diameter shaft part 26a of the support bolt 26. The support bolt 26 (the large diameter shaft part 26a and the small diameter shaft part 26c) that connects the support bracket 13 and the main bracket 12 together is positioned at a rear side (a side opposite to the detection direction of the outside sensor 11) of the outside sensor 11.

A plurality of disk springs 27 as a bias member are provided between the head part 26b of the support bolt 26 and the front surface of the base wall 13a of the support bracket 13. The disk spring 27 gives a rotation resistance between the main bracket 12 and the support bracket 13.

In the present embodiment, the support bolt 26, the first penetration hole 22, the second penetration hole 23, the bearing ring 24, the weld nut 25, the disk spring 27, and the like constitute the rotation mechanism 14. The large diameter shaft part 26a and the small diameter shaft part 26c of the support bolt 26 constitute a rotation shaft of the rotation mechanism 14. A center axis line of the large diameter shaft part 26a and the small diameter shaft part 26c of the support bolt 26 constitute a rotation axis line L1 of the rotation mechanism 14 that is substantially parallel to a roll axis R (refer to FIG. 1) of the vehicle. The rotation mechanism 14 enables a relative rotation of the support bracket 13 and the main bracket 12 around the rotation axis line L1.

The position adjustment mechanism 15 adjusts a relative rotation position between the support bracket 13 and the main bracket 12 around the rotation axis line L1. Thereby, the slant angle in a vehicle roll direction of the outside detection surface 11a of the outside sensor 11 is adjusted.

In a case of the millimeter-wave radar, the laser radar, the ultrasonic sensor, and the sonar, for example, the "outside detection surface" refers to a transmission reception plane of outside detection waves. In a case of the optical camera, a lens surface of an objective lens corresponds to the "outside detection surface".

The position adjustment mechanism 15 includes a base member 30 that is attached to the fixation wall 21 of the support bracket 13, a male screw member 31 that is rotatably supported by the base member 30, and a female screw member 32 that is attached to the extension wall 19a of the main bracket 12.

The base member 30 has a fixation part 30a that is fastened by a bolt to the fixation wall 21 of the support bracket 13, a support part 30b that rotatably supports the male screw member 31, and a guide part 30c that guides an insertion of a tool for operating the male screw member 31 to be rotated (for rotating the male screw member 31 and the female screw member 32 relative to each other). The fixation part 30a, the support part 30b, and the guide part 30c are integrally formed of a plastic.

The fixation part 30a is a block that has a plate shape and that is overlapped on a lower surface of the fixation wall 21. The support part 30b is provided to continue to one side of the fixation part 30a. The support part 30b is a block having a substantially tube shape. The central axis line of the support part 30b is directed substantially in the vertical direction. A shaft part of the male screw member 31 is supported rotatably by an inner side of the tube shape portion of the support part 30b. The guide part 30c is provided to continue to a front part of the support part 30b. The guide part 30c has a base guide wall 30c-1 that has a substantially U shape in a cross-section and that extends frontward from the support part 30b and a displacement regulation wall 30c-2 that has an inverted U shape in a cross section and that is provided to continue to a front end part of the base guide wall 30c-1.

In the present embodiment, it is assumed that the tool used for operation which is inserted in the guide part 30c is a Phillips screwdriver having a convergent front end part. The front end part of the Phillips screwdriver is inserted in the guide part 30c from the front direction along the front-to-rear direction. A reception part shape that is opened upward and that receives a lower half part of the Phillips screwdriver is formed on the base guide wall 30c-1. The reception part shape on a rear end side of the base guide wall 30c-1 is formed in a taper shape substantially along the front end part shape of the Phillips screwdriver. The displacement regulation wall 30c-2 regulates an upward displacement of the base side of the Phillips screwdriver when the front end part of the Phillips screwdriver is inserted in the reception part of the base guide wall 30c-1.

In the present embodiment, the base guide wall 30c-1 and the displacement regulation wall 30c-2 of the guide part 30c constitute a tool insertion opening in which the tool (Phillips screwdriver) is inserted. The tool insertion opening is opened toward the outside detection direction (vehicle frontward direction) of the outside sensor 11.

The male screw member 31 is formed by insert molding in which a bolt part 34 made of a metal is inserted in an operation part 33 made of a plastic and is molded. The operation part 33 and the bolt part 34 are formed concentrically. A head portion side of the bolt part 34 is integrally joined to the operation part 33. The bolt part 34 has a shaft portion 34a that extends from the head portion, and a male screw is formed on the shaft portion 34a. The operation part 33 has a tubular wall (not shown) that is supported rotatably by the support part 30b of the base member 30 and a gear portion 33a that is provided to continue to an end part of the tubular wall. The operation part 33 is supported by the base member 30, and thereby, the rotation axis line of the male screw member 31 is directed in the vertical direction.

The gear portion 33a forms a crown gear shape in which a plurality of teeth 33a-2 are provided on one surface of a circular plate section 33a-1 so as to protrude and be arranged in an annular form. The plurality of teeth 33a-2 of the gear portion 33a are provided to protrude in the downward direction and face an upper part on the base side of the base guide wall 30c-1 of the base member 30. The front end part of the Phillips screwdriver (tool) that is inserted in the reception part of the base guide wall 30c-1 is engaged with the teeth 33a-2 of the gear portion 33a. When the Phillips screwdriver (tool) is operated to be rotated in this state, the entire male screw member 31 is rotated around the rotation axis line via the gear part 33a.

The female screw member 32 is constituted of a plastic member having a substantially tubular shape and is attached to an attachment hole (not shown) that is formed on the extension wall 19a of the main bracket 12. The female screw member 32 has a clip latch structure and is latched in a state of being fitted in the attachment hole. A female screw is formed on an inner surface of the tubular shape part of the female screw member 32. The male screw of the shaft portion 34a of the male screw member 31 is screwed to the female screw of the female screw member 32.

The male screw member 31 that is attached to the support bracket 13 via the base member 30 is arranged at a position that is spaced in a radial direction from the rotation axis line L1 of the rotation mechanism 14. Similarly, the female screw member 32 that is attached to the main bracket 12 is arranged at a position that is spaced in the radial direction from the rotation axis line L1 of the rotation mechanism 14. Therefore, when the male screw member 31 is operated to be rotated by the Phillips screwdriver described above or the like, the separation distance between the female screw member 32 and the head part side of the male screw member 31 is changed. As a result, the slant angle of the support bracket 13 relative to the main bracket 12 is changed, and the slant angle in the vehicle roll direction of the outside sensor 11 is adjusted.

As shown in FIG. 2 and FIG. 3, a fixation plate 35 that extends in the lateral direction is integrally joined to right and left side edge parts of the base wall 13a of the support bracket 13. An elongated hole 36 which has a substantially arc shape and of which the center is the rotation axis line L1 is formed on each fixation plate 35. A fixation bolt 37 is inserted through each elongated hole 36. A penetration hole (not shown) and a weld nut 38 (refer to FIG. 3 and FIG. 4) are provided on the base wall 12Aa of the main bracket 12 in a region that corresponds to the elongated hole 36 of each fixation plate 35. The fixation bolt 37 is screwed in the weld nut 38 on the main bracket 12 side in a state of penetrating through the elongated hole 36 after adjusting the slant angle of the support bracket 13 by the position adjustment mechanism 15. Thereby, the slant angle of the support bracket 13 relative to the main bracket 12 is fixed, and, as a result, the slant angle in the vehicle roll direction of the outside sensor 11 is also fixed.

In the present embodiment, the fixation bolt 37 constitutes a positioning fixation member that fixes the relative rotation position between the support bracket 13 and the main bracket 12. A head part 37a of the fixation bolt 37 constitutes an operation part of the positioning fixation member.

Each of the left and right bent walls 12B1-2, 12Br-2 (attachment seat) that are arranged to be offset in the frontward direction (outside detection direction of the outside sensor 11) with respect to the base wall 12Aa of the main bracket 12 is arranged at a position that is not overlapped with the head part 37a (operation part) of the fixation bolt 37 when seen from the vehicle frontward direction (from the outside detection direction). Specifically, the left bent wall 12B1-2 is arranged at a left outer position of the head part 37a of the left fixation bolt 37, and each of the right two bent walls 12Br-2 is arranged at each of upper and lower positions of the head part 37a of the right fixation bolt 37.

As shown in FIG. 4 and FIG. 5, the cover member 16 that is attached to the bent walls 12B1-2, 12Br-2 (attachment seat) of the main bracket 12 is formed in a horizontally elongated substantially rectangular shape. The cover member 16 is formed so as to cover a gap between the opening 3 of the bumper face 2 of the vehicle and an outer circumferential region of the outside sensor 11. The cover member 16 covers the support bracket 13 and the position adjustment mechanism 15 from the vehicle frontward direction (from the outside detection direction of the outside sensor 11) and prevents the support bracket 13 and the position adjustment mechanism 15 from being seen from the vehicle frontward direction.

The cover member 16 includes a cover main body 40 having an opening part 40a at a center part and a frame member 41 that is attached to an outer circumferential edge part of the cover main body 40. The cover main body 40 is formed of a hard plastic material in a horizontally elongated substantially rectangular shape in a front view. The outside detection surface 11a of the outside sensor 11 is exposed toward the vehicle frontward direction from the opening part 40a of the cover main body 40. The front surface of the cover main body 40 is formed to be hollowed in a recess shape from the outer circumferential edge part toward the opening part 40*a*. The frame member 41 is formed of a soft plastic material. A soft plastic material similar to the frame member 41 may be also arranged between the outside sensor 11 and the opening part 40*a* of the cover main body 40.

A boss part 42 is provided to protrude on the rear surface of the cover main body 40 at each of positions that correspond to the bent walls 12Bl-2, 12Br-2 (attachment seat) of the main bracket 12. A latch portion 43 made of a plastic is provided on a front end portion of each boss part 42. The latch portion 43 may be integrally formed on the boss part 42. Alternatively, the latch portion 43 may be formed as a separate component and be attached to the boss part 42. The latch portion 43 has a guide protrusion 43*a* that is convergent toward the front end side and a latch flange 43*b* that is provided to continue to the base part of the guide protrusion 43*a*. Each latch portion 43 is inserted in the corresponding latch hole 18 of the bent walls 12Bl-2, 12Br-2 and is latched. After the guide protrusion 43*a* is inserted in the latch hole 18 first, by pushing each latch portion 43 rearward in that state, the latch flange 43*b* is deformed, and each latch portion 43 is inserted in the latch hole 18. The latch flange 43*b* passes through the latch hole 18, and thereby, the latch portion 43 is stopped by an edge part of the latch hole 18. Each latch portion 43 is latched by the corresponding latch hole 18, and thereby, the cover member 16 is fixed to the main bracket 12.

In the outside sensor unit 10 of the present embodiment, the slant angle in the vehicle roll direction of the outside sensor 11 is adjusted as described below.

The cover member 16 is in a state of not being attached to the main bracket 12 and being detached from the vehicle body. In this state, the outside sensor 11, the support bracket 13, and the position adjustment mechanism 15 are exposed toward the vehicle frontward direction through the opening 3 of the bumper face 2. In this state, the tool is inserted in the opening 3 of the bumper face 2, the fixation bolt 37 is loosened by the tool, and the fixation of rotation of the position adjustment mechanism 15 is released.

Next, while performing inspection of the detection range of the outside sensor 11 that is attached to the vehicle, the Phillips screwdriver is inserted in the guide part 30*c* of the position adjustment mechanism 15, and the male screw member 31 of the position adjustment mechanism 15 is rotated by the Phillips screwdriver. Thereby, the support bracket 13 is rotated relative to the main bracket 12, and the slant angle in the vehicle roll direction of the outside sensor 11 is appropriately adjusted.

Then, the fixation bolt 37 is screwed by the tool, and the rotation position of the support bracket 13 relative to the main bracket 12 is fixed. Further, after that, by arranging the cover member 16 at the opening 3 of the bumper face 2 and pushing the cover member 16 by hand, each latch portion 43 of the cover member 16 is fitted into the corresponding latch hole 18 of the main bracket 12. As a result, the cover member 16 is attached so as to cover the gap between the outside sensor 11 and the opening 3 of the bumper face 2.

As described above, in the outside sensor unit 10 of the present embodiment, the support bracket 13 and the main bracket 12 are rotated relative to each other around the rotation axis line L1 of the rotation mechanism 14 by the operation of the position adjustment mechanism 15, and thereby, it is possible to appropriately adjust the slant angle in the vehicle roll direction of the outside sensor 11. Further, the outside sensor unit 10 of the present embodiment has a configuration in which the support bracket 13 and the main bracket 12 are connected together by the rotation mechanism 14, and the relative rotation position between the support bracket 13 and the main bracket 12 is adjusted by the position adjustment mechanism 15, and therefore, it is possible to simplify the structure of the outside sensor 11. Accordingly, when the outside sensor unit 10 of the present embodiment is employed, it is possible to appropriately adjust the slant angle in the vehicle roll direction of the outside sensor 11 without complicating the structure of the outside sensor 11.

Further, in the outside sensor unit 10 of the present embodiment, the rotation mechanism 14 has a rotation shaft (shaft of the support bolt 26) that penetrates through the main bracket 12 and the support bracket 13 at a rear part side of the outside sensor 11, and the axis line of the rotation shaft constitutes the rotation axis line L1 of the rotation mechanism 14. Therefore, it is possible to connect the support bracket 13 and the main bracket 12 together rotatably by a simple configuration, and since the rotation mechanism 14 is not positioned in the outside detection direction of the outside sensor 11, it is possible to ensure a wide outside detection range of the outside sensor 11.

In the present embodiment, the shaft of the support bolt 26 that penetrates through the support bracket 13 and the main bracket 12 constitutes the rotation shaft of the rotation mechanism 14. However, the rotation shaft may be fixed to any one of the support bracket 13 and the main bracket 12 by welding or the like, and the rotation shaft may penetrate through the other of the support bracket 13 and the main bracket 12.

The outside sensor unit 10 of the present embodiment has a configuration in which the shaft of the support bolt 26 that constitutes the rotation shaft is inserted through the first penetration hole 22 of the support bracket 13 and the second penetration hole 23 of the main bracket 12, and therefore, it is possible to easily assemble the rotation mechanism 14 to the support bracket 13 and the main bracket 12 without requiring a burdensome operation in which the rotation shaft is fixed by welding to the main bracket 12 and the support bracket 13.

Further, in the outside sensor unit 10 of the present embodiment, the position adjustment mechanism 15 has the male screw member 31 and the female screw member 32 that are screwed to each other, the male screw member 31 is latched at a position which is separated in the radial direction from the rotation axis line L1 on the support bracket 13 side, and the female screw member 32 is latched at a position which is separated in the radial direction from the rotation axis line L1 on the main bracket 12 side. Therefore, by rotating the male screw member 31 and the female screw member 32 relative to each other, it is possible to rotate the support bracket 13 and the main bracket 12 relative to each other, and it is possible to easily adjust the slant angle in the vehicle roll direction of the outside sensor 11.

In the present embodiment, the male screw member 31 is latched at the support bracket 13 side, and the female screw member 32 is latched at the main bracket 12 side. However, conversely, the male screw member 31 may be latched at the main bracket 12 side, and the female screw member 32 may be latched at the support bracket 13 side.

Further, in the outside sensor unit 10 of the present embodiment, the base guide wall 30*c*-1 and the displacement regulation wall 30*c*-2 which are the tool insertion opening of the position adjustment mechanism 15 are opened toward the vehicle frontward direction which is the outside detection direction of the outside sensor 11. Therefore, it is possible to insert the Phillips screwdriver which is an operation tool from the vehicle frontward direction and operate the position adjustment mechanism 15. At the time of operation of the position adjustment mechanism 15, even when the Phillips screwdriver is operated so as to be pressed, it is possible to allow the press load to be smoothly supported by the vehicle body side. Accordingly, when this configuration is employed, it is possible to prevent the support bracket 13 and the main bracket 12 from being fluctuated when the Phillips screwdriver is operated, and it is possible to stably perform the adjustment operation of the position adjustment mechanism 15.

Further, in the outside sensor unit 10 of the present embodiment, the vehicle frontward side (outside detection direction of the outside sensor 11) of the support bracket 13 and the position adjustment mechanism 15 are covered by the cover member 16. Therefore, when this configuration is employed, by a simple configuration, it is possible to prevent the degradation of the appearance due to the support bracket 13 and the position adjustment mechanism 15 being seen from the outside, and it is possible to protect the position adjustment mechanism 15 from the outside by the cover member 16.

Further, since the outside sensor unit 10 of the present embodiment includes the fixation bolt 37 that fixes the relative rotation position between the support bracket 13 and the main bracket 12, it is possible to adjust the relative rotation position between the support bracket 13 and the main bracket 12 by the position adjustment mechanism 15, and after that, it is possible to fix the relative rotation position between the support bracket 13 and the main bracket 12 by the fixation bolt 37. Accordingly, when this configuration is employed, it is possible to prevent the relative rotation position between the support bracket 13 and the main bracket 12 from being displaced by the self-weight of the outside sensor 11 and the support bracket 13 or an input of an external force.

The invention is not limited to the embodiment described above, and a variety of design changes can be made without departing from the scope of the invention. For example, the above embodiment is described using an example in which the outside sensor unit 10 is arranged at right and left positions of the front bumper of the vehicle; however, the outside sensor unit 10 may be arranged at right and left positions of the rear bumper. Further, the outside sensor unit 10 may be arranged at a part other than the bumper such as a front grille of a vehicle.

What is claimed is:

1. A vehicle outside sensor unit, comprising:
an outside sensor that detects a situation around a vehicle;
a main bracket that is attached to a vehicle body;
a support bracket that supports the outside sensor and that is attached to the main bracket;
a rotation device that has a rotation axis line which is substantially parallel to a roll axis of the vehicle and that connects the support bracket and the main bracket together rotatably around the rotation axis line; and
a position adjustment device that is configured to adjust a relative rotation position between the support bracket and the main bracket around the rotation axis line,
wherein the rotation device has a rotation shaft that penetrates through at least one of the support bracket and the main bracket at an opposite side of an outside detection direction of the outside sensor, and an axis line of the rotation shaft constitutes the rotation axis line,
wherein the position adjustment device comprises a male screw member that is provided on one of the support bracket or the main bracket at a position which is spaced apart from the rotation axis line, a female screw member that is provided on the other of the support bracket or the main bracket at a position which is spaced apart from the rotation axis line and that is screwed to the male screw member, and a tool insertion opening in which a tool for rotating the male screw member and the female screw member relative to each other is insertable along a tool insertion axis parallel to the rotation axis line,
wherein the male screw member or the female screw member is rotatable by the tool to rotate the main bracket and the support bracket about the rotation axis line, and
wherein the tool insertion opening opens toward the outside detection direction of the outside sensor.

2. The vehicle outside sensor unit according to claim 1, wherein
the support bracket has a first penetration hole through which the rotation shaft penetrates, the main bracket has a second penetration hole through which the rotation shaft penetrates, and the rotation shaft is rotatably inserted through the first penetration hole and the second penetration hole.

3. The vehicle outside sensor unit according to claim 1, comprising:
a cover member that covers the support bracket and the position adjustment device from the outside detection direction of the outside sensor.

4. The vehicle outside sensor unit according to claim 1, comprising:
a positioning fixation member that fixes the relative rotation position between the support bracket and the main bracket.

5. The vehicle outside sensor unit according to claim 1, wherein the rotation device comprises a bearing ring which is attached to the first penetration hole and to which the rotation shaft is rotatably fitted, and
a shaft length of the bearing ring is longer than a plate thickness of the support bracket.

6. The vehicle outside sensor unit according to claim 1, wherein the main bracket and the support bracket are configured to rotate about the rotation axis line, along a plane orthogonal to the rotation axis line, in response to adjustment of the male screw member or the female screw member by the tool.

7. The vehicle outside sensor unit according to claim 1, wherein the main bracket and the support bracket are configured to rotate about the rotation axis line in response to physical contact of the tool with a single screw member being the male screw member or the female screw member.

* * * * *